United States Patent
Yeh et al.

(10) Patent No.: US 10,802,638 B1
(45) Date of Patent: Oct. 13, 2020

(54) TOUCH DISPLAY DEVICE

(71) Applicant: HIGGSTEC INC., Taoyuan (TW)

(72) Inventors: Chun-Wei Yeh, Taipei (TW);
Sheng-Liang Lin, Yilan County (TW);
Yi-Han Wang, New Taipei (TW);
Hung-Yu Tsai, Yilan County (TW)

(73) Assignee: HIGGSTEC INC., Taoyuan (TW)

( * ) Notice: Subject to any disclaimer, the term of this patent is extended or adjusted under 35 U.S.C. 154(b) by 0 days.

(21) Appl. No.: 16/512,493

(22) Filed: Jul. 16, 2019

(51) Int. Cl.
  *G06F 3/041* (2006.01)
  *G06F 3/0488* (2013.01)
  *G09G 5/00* (2006.01)

(52) U.S. Cl.
  CPC .......... *G06F 3/0412* (2013.01); *G06F 3/0416* (2013.01); *G06F 3/0488* (2013.01); *G09G 5/006* (2013.01)

(58) Field of Classification Search
  CPC . B32B 7/12; B32B 2457/20; B32B 2457/208; B32B 2457/202; B32B 2457/206; G02F 2202/28; G02F 1/13338; G02F 1/1333; G02F 2001/133331; G06F 2203/04103; G06F 3/041; G06F 3/0412; G06F 1/1637
  See application file for complete search history.

(56) References Cited

U.S. PATENT DOCUMENTS

| | | | | |
|---|---|---|---|---|
| 2011/0235364 A1* | 9/2011 | Lo | ........................... | G06F 3/044 362/611 |
| 2017/0166787 A1* | 6/2017 | Liao | ................... | C08F 290/067 |
| 2018/0112112 A1* | 4/2018 | Onishi | .................... | G06F 3/041 |
| 2019/0219862 A1* | 7/2019 | Yoshida | ............ | G02F 1/133308 |
| 2020/0095469 A1* | 3/2020 | Yu | ............................ | G02B 1/14 |

* cited by examiner

*Primary Examiner* — Dong Hui Liang
(74) *Attorney, Agent, or Firm* — Li & Cai Intellectual Property (USA) Office

(57) ABSTRACT

A touch display device includes a display module, a touch module and a light-transmitting substrate. The display module has a display surface and a bottom surface opposite to the display surface. The touch module is fixed to the display surface by an adhesive. The adhesive, the touch module and the display surface jointly define an accommodating space between the display module and the touch module. The light-transmitting substrate is disposed in the accommodating space. One side of the light-transmitting substrate is fixed to the display surface by a first optical adhesive, and the other side of the light-transmitting substrate is fixed to the touch module by a second optical adhesive. An adhesive strength of the adhesive is higher than an adhesive strength of the first optical adhesive, and the adhesive strength of the adhesive is higher than an adhesive strength of the second optical adhesive.

13 Claims, 13 Drawing Sheets

TOUCH DISPLAY DEVICE

FIELD OF THE DISCLOSURE

The present disclosure relates to a touch display device, and more particularly to an industrial touch display device.

BACKGROUND OF THE DISCLOSURE

As a display and a touch module of a conventional industrial touch display device are fixed to each other and difficult to be disassembled, it is not easy for the maintenance personnel to retain the undamaged components when either the display or the touch module of the conventional industrial touch display device is damaged. As a result, manufacturers or vendors thereof have to replace the entire touch display device including the display and the touch module, so that the maintenance cost and environmental pollution are increased. Therefore, a touch display device of the present application is provided to effectively solve the aforesaid problems.

SUMMARY OF THE DISCLOSURE

In response to the above-referenced technical inadequacies, the present disclosure provides a touch display device.

In one aspect, the present disclosure provides a touch display device including a display module, a touch module and a light-transmitting substrate. The display module is powered to operate independently. The display module has a display surface and a bottom surface opposite to the display surface. When the display module is powered and operating, the display surface displays an image. The touch module is fixed to the display surface by an adhesive. The adhesive, the touch module and the display surface jointly define an accommodating space between the display module and the touch module. The light-transmitting substrate is disposed in the accommodating space. One side of the light-transmitting substrate is fixed to the display surface by a first optical adhesive, and the other side of the light-transmitting substrate is fixed to the touch module by a second optical adhesive. The light-transmitting substrate is not formed of solidified optical adhesive. An adhesive strength of the adhesive is higher than an adhesive strength of the first optical adhesive, the adhesive strength of the adhesive is higher than an adhesive strength of the second optical adhesive, the adhesive strength of the adhesive ranges from 50N/25 millimeter (mm) to 100N/25 mm, the adhesive strength of the second optical adhesive ranges from 15N/25 mm to 40N/25 mm, and the adhesive strength of the first optical adhesive is smaller than or equal to 5N/25 mm. A percentage difference between a refractive index of the touch module and a refractive index of the light-transmitting substrate ranges from 0.1% to 5%.

In certain embodiments, the present disclosure provides a touch display device. The display module includes a display and a frame body. One side of the display is the display surface. The frame body is fixed to a periphery of the display. The frame body includes a surrounding covering portion and a top covering portion. The surrounding covering portion covers the periphery of the display. The top covering portion is connected to the surrounding covering portion. The top covering portion is correspondingly disposed on the one side of the display that is the display surface. The top covering portion and the display surface jointly define an accommodating groove. The adhesive is fixed to one side of the surrounding covering portion. The touch module, the adhesive, the top covering portion and the display surface jointly define an accommodating space. A portion of the light-transmitting substrate which is distal from the display surface is higher than a top surface of the top covering portion, the top surface is disposed on one side of the top covering portion which is distal from the display surface. The light-transmitting substrate is disposed at a direction of a normal line of the display surface, and the light-transmitting substrate is higher than the top surface with a predetermined height. A thickness of the adhesive in the direction of the normal line of the display surface is greater than or equal to the predetermined height.

In one aspect, the present disclosure provides a touch display device including a display module, a frame body, a light-transmitting substrate, an adhesive, a first indium tin oxide (ITO) layer, a second optical adhesive and a touch module. The display module is powered to operate independently. The display module has a display surface and a bottom surface opposite to the display surface. When the display module is powered and operating, the display surface displays an image. The frame body is fixed to a periphery of the display, the frame body includes a surrounding covering portion and a top covering portion, the surrounding covering portion covers the periphery of the display, the top covering portion is connected to the surrounding covering portion, the top covering portion is correspondingly disposed on the one side of the display that is the display surface, and the top covering portion and the display surface jointly define an accommodating groove. The light-transmitting substrate is fixed to the display surface by a first optical adhesive, the light-transmitting substrate is correspondingly disposed in the accommodating groove, a portion of the light-transmitting substrate which is distal from the display surface is higher than a top surface of the top covering portion which is distal from the display surface, the light-transmitting substrate in a direction of a normal line of the display surface is higher than the top surface with a predetermined height. The adhesive is disposed on the top surface, and a thickness of the adhesive in the direction of the normal line of the display surface is greater than or equal to the predetermined height. The first indium tin oxide (ITO) layer is formed on one side of the light-transmitting substrate which faces the display surface or one side of the light-transmitting substrate which is distal from the display surface. The second optical adhesive is disposed on the light-transmitting substrate, a thickness of the second optical adhesive in the direction of the normal line of the display surface is greater than or equal to the predetermined height. The touch module is fixed to one side of the light-transmitting substrate which is distal from the display module by the second optical adhesive. The touch module is fixed to the top surface by the adhesive. The top covering portion, the light-transmitting substrate, and the display module are correspondingly disposed within a range of orthographic projection of one side of the touch module toward the light-transmitting substrate. The touch module includes a second ITO layer. The first and second ITO layers cooperate with each other to correspondingly generate an X axis position signal and a Y axis position signal when the touch module is touched. A percentage difference between a refractive index of the touch module and a refractive index of the light-transmitting substrate ranges from 0.1% to 5%. An adhesive strength of the adhesive is higher than an adhesive strength of the first optical adhesive, the adhesive strength of the adhesive is higher than an adhesive strength of the second optical adhesive, the adhesive strength of the adhesive ranges from 50N/25 millimeter (mm) to 100N/25 mm, the adhesive strength of the second optical adhesive ranges from 15N/25 mm to 40N/25 mm, and the adhesive strength of the first optical adhesive is smaller than or equal to 5N/25 mm.

In certain embodiments, the present disclosure provides a touch display device. A sum of a thickness of the light-transmitting substrate in the direction of the normal line of the display surface and a thickness of the first optical adhesive in the direction of the normal line of the display surface is smaller than or equal to a sum of the thickness of the adhesive in the direction of the normal line of the display surface and a depth of the accommodating groove in the direction of the normal line of the display surface. The thickness of the light-transmitting substrate in the direction of the normal line of the display surface is greater than or equal to 0.1 mm, the thickness of the adhesive in the direction of the normal line of the display surface ranges from 0.05 mm to 1.0 mm, and the depth of the accommodating groove in the direction of the normal line of the display surface is greater than or equal to 0.1 mm.

Therefore, by virtue of "the adhesive strength of the adhesive ranges from 50N/25 mm to 100N/25 mm", "the adhesive strength of the second optical adhesive ranges from 15N/25 mm to 40N/25 mm", and "the adhesive strength of the first optical adhesive is smaller than or equal to 5N/25 mm" of the touch display device of the present application, the display module can be easily disassembled by a maintenance personnel, such that the maintenance thereof becomes more convenient.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
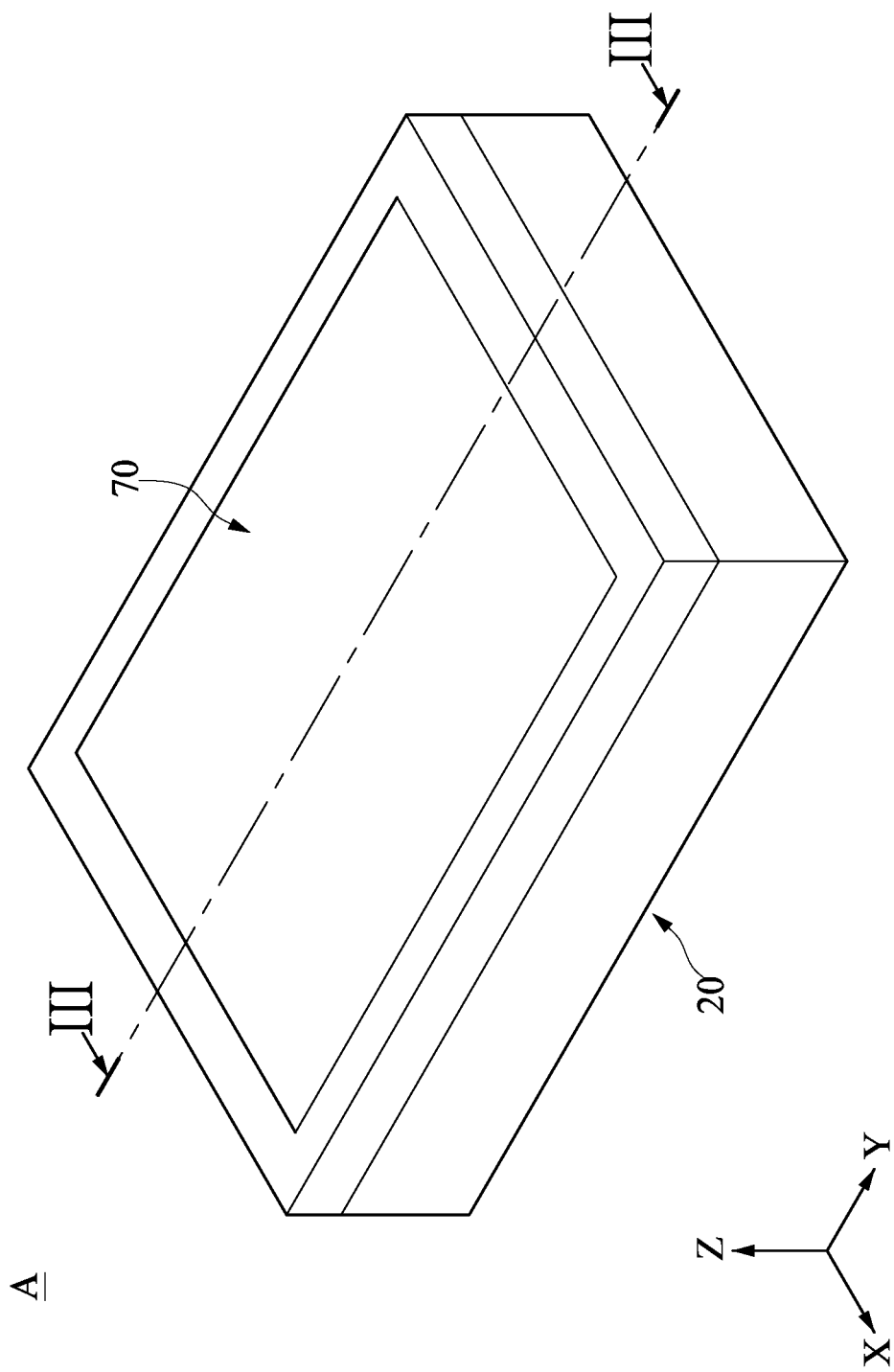
FIG. 1 is a schematic view of a touch display device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
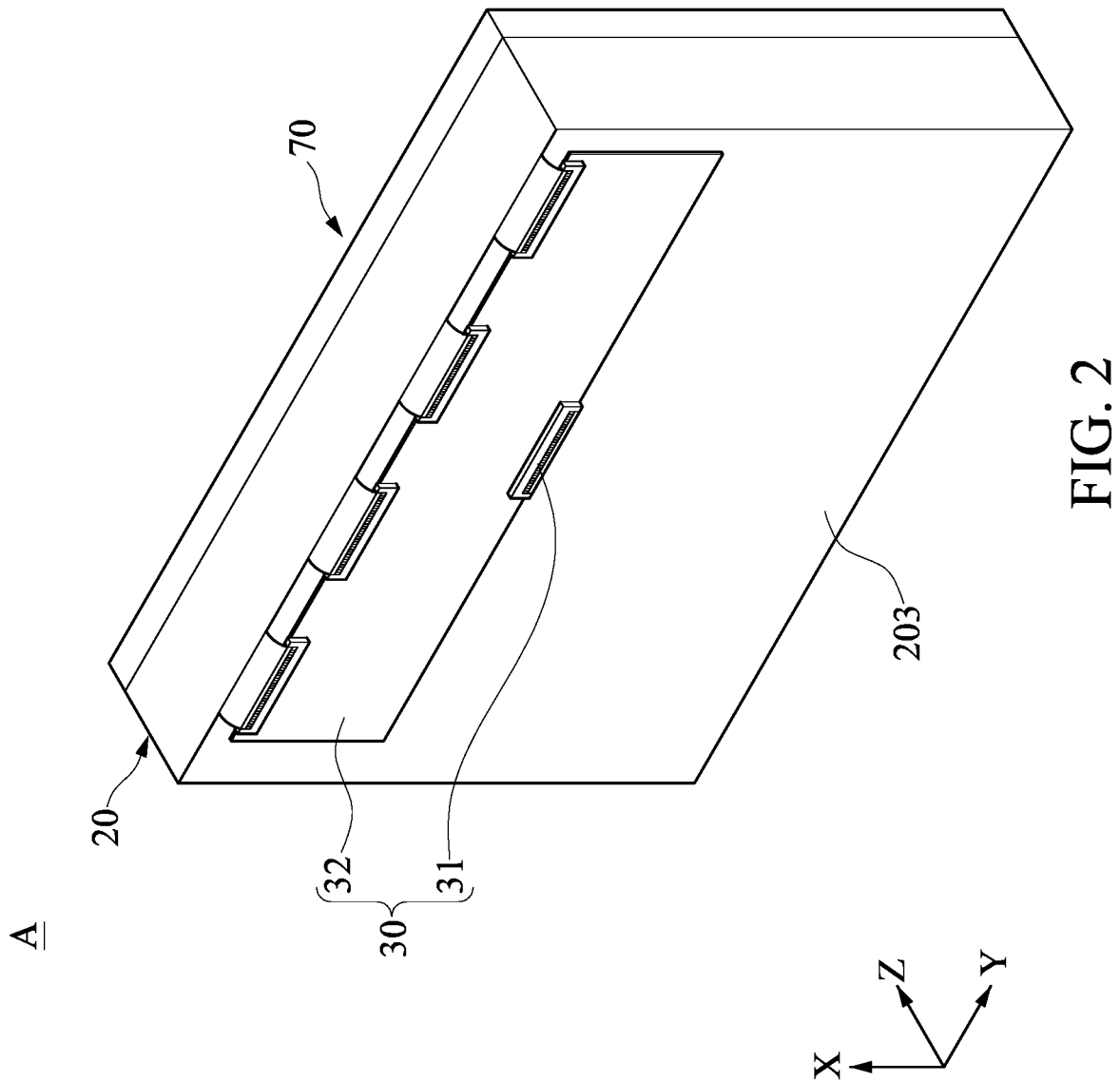
FIG. 2 is a schematic view taken from another perspective of the touch display device according to the first embodiment of the present disclosure.
Figure 3:
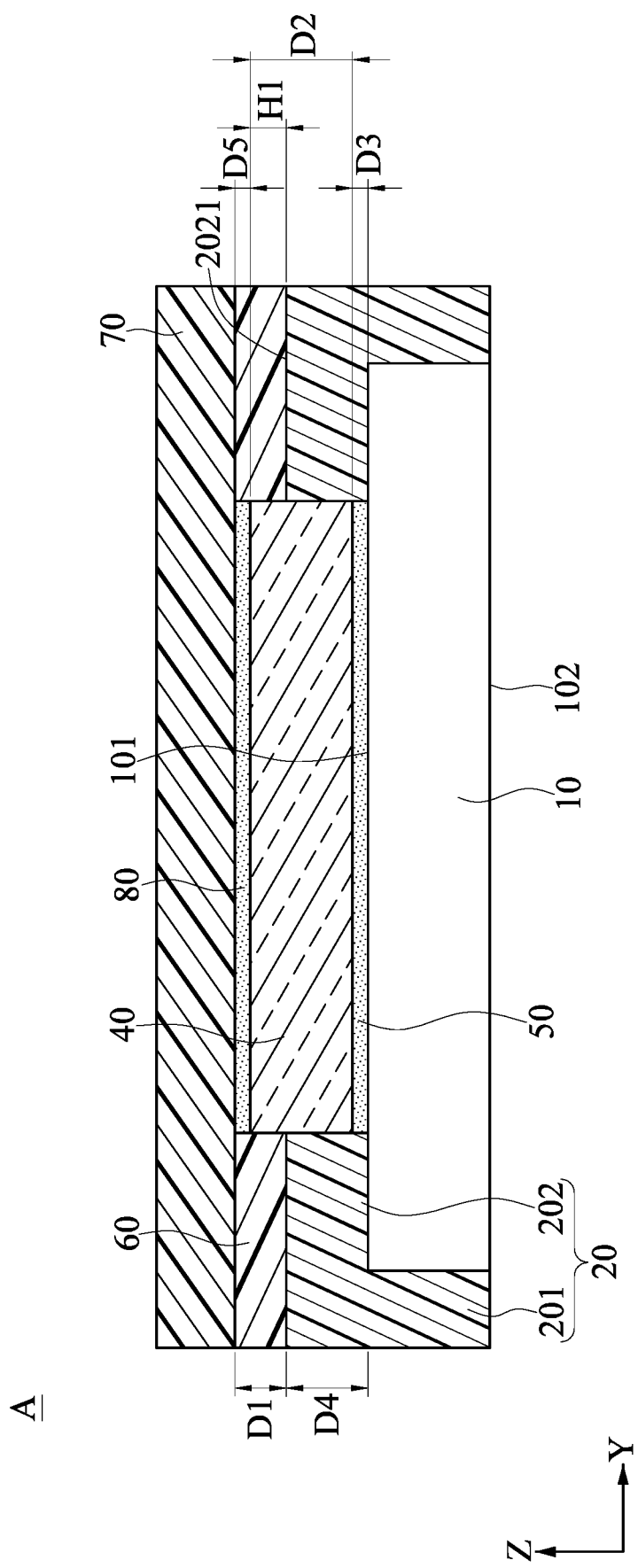
FIG. 3 is a cross-sectional view of the touch display device taken along line III of FIG. 1 according to the first embodiment of the present disclosure.
Figure 4:
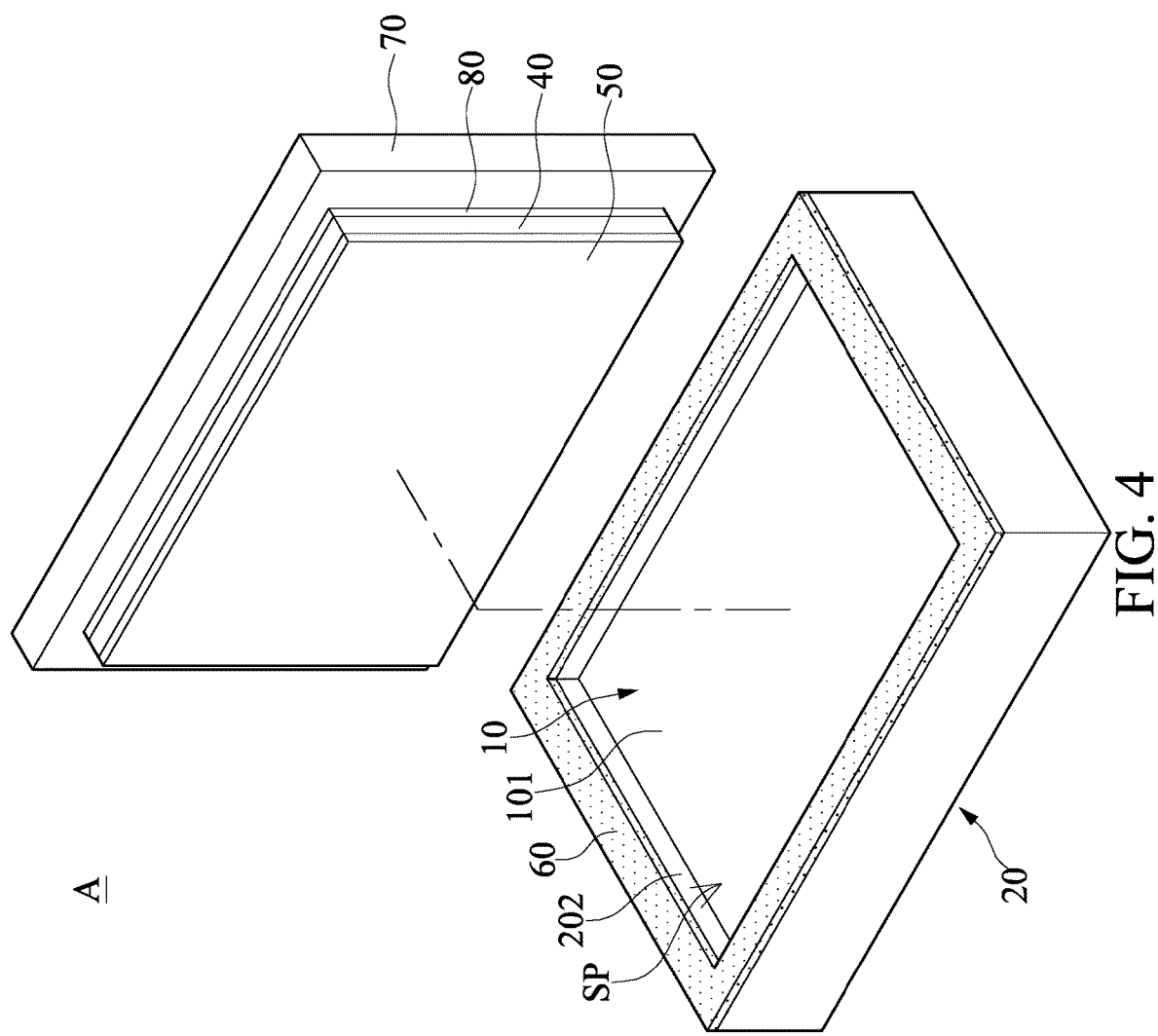
FIG. 4 is an exploded view of the touch display device according to the first embodiment of the present disclosure.
Figure 5:
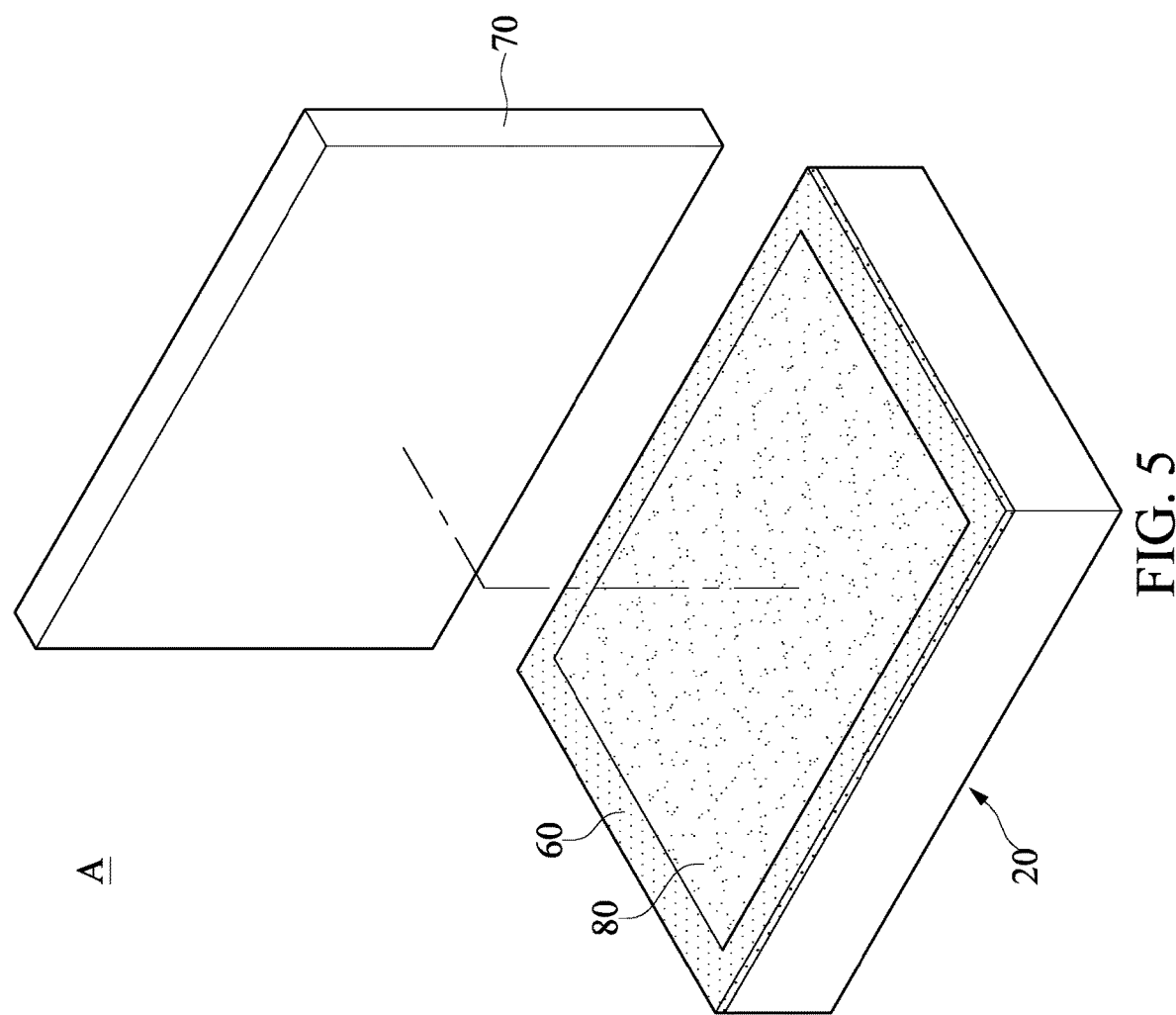
FIG. 5 is a schematic view of the touch display device after cutting according to the first embodiment of the present disclosure.

Referring to FIG. 1 to FIG. 5, FIG. 1 is a schematic view of a touch display device according to a first embodiment of the present disclosure; FIG. 2 is a schematic view taken from another perspective of the touch display device according to the first embodiment of the present disclosure; FIG. 3 is a cross-sectional view taken along line III of FIG. 1 of the touch display device according to the first embodiment of the present disclosure; FIG. 4 is an exploded view of the touch display device according to the first embodiment of the present disclosure; FIG. 5 is a schematic view of the touch display device after cutting according to the first embodiment of the present disclosure.

A touch display device A includes a display module 10, a frame body 20, an electrical connection module 30, a light-transmitting substrate 40, a first optical adhesive 50, an adhesive 60, a touch module 70 and a second optical adhesive 80.

The display module 10 is powered to operate independently. The display module 10 has a display surface 101 and a bottom surface 102 opposite to the display surface 101. When the display module 10 is powered and operating, the display surface 101 displays an image. In actual practice, the display module 10 can be independently manufactured or simply assembled and then be sold. In actual practice, the display module 10 can be a rectangular cube, or a cube, but not limited thereto. Moreover, a size of the display module 10 can be customized.

The frame body 20 is fixed to a periphery of the display module 10, the frame body 20 includes a surrounding covering portion 201 and a top covering portion 202. The surrounding covering portion 201 covers the periphery of the display module 10. The top covering portion 202 is connected to the surrounding covering portion 201. The top covering portion 202 is correspondingly disposed on the one side of the display surface 101 of the display module 10. The top covering portion 202 and the display surface 101 jointly define an accommodating groove SP (as shown in FIG. 4).

Since the display module 10 is covered by the frame body 20, a better protection of the display module 10 can be obtained, especially in the industrial environment. In other words, since the display module 10 of the touch display device A of the present application is covered by the frame body 20, the display module 10 is unlikely to be damaged in an external environment, and the service life of the touch display device A can be extended. In actual practice, the material of the frame body 20 can be customized as metal or plastic, but not limited thereto.

As shown in FIG. 2, the electrical connection module 30 can include an electrical connector 31 and a circuit board 32. The electrical connector 31 is configured on the circuit board 32. The circuit board 32 can further be configured on the electronic components that support operations of the display module 10. The display module 10 is electrically connected to an external control device (e.g. an industrial computer) via the electrical connector 31 so as to receive an electric power and an image signal provided from the external control device. In other words, the external control device is electrically connected to the electrical connector 31 via the electric connection cables so as to control the operation of the display module 10. In this embodiment, the electrical connection module 30 includes one electrical connector 31. However, the number of the electrical connector 31 is not limited in the present disclosure. Moreover, the position of the electrical connector 31 should not be limited to be configured on one side of the bottom covering portion 203 (which will be demonstrated later), can be configured on elsewhere if needed. In the embodiment that the frame body 20 does not include the bottom covering portion 203, the frame body 20 and the display module 10 are fixedly connected to each other. Furthermore, fasteners (such as tapes) can further be configured between the frame body 20 and the display module 10 so as to strengthen the linking force in between.

Specifically, in actual practice, the display module 10 and the frame body 20 can be manufactured as a group and then be sold. The display module 10 and the frame body 20 can also be simply assembled and then applied to the product, or the display module 10 covered by the frame body 20 can be directly sold.

As shown in FIG. 3 and FIG. 4, the light-transmitting substrate 40 is fixed to the display surface 101 by a first optical adhesive 50. The light-transmitting substrate 40 is correspondingly disposed in an accommodating groove SP. A portion of the light-transmitting substrate 40 which is distal from the display surface 101 is higher than a top surface 2021 of the top covering portion 202 which is distal from the display surface 101. The light-transmitting substrate 40 can be any transparent structure that permits light to transmit through. It is noted that the light-transmitting substrate 40 should allow the technical personnel to see through the light-transmitting substrate 40 from the side of the light-transmitting substrate 40 opposite to the display surface 101, and to capture the image displayed on the display surface 101 of the display module 10. For example, the light-transmitting substrate 40 can be a glass, an optical plastic (e.g. polymethyl methacrylate (PMMA)), or any combination of the glass and the optical plastic, but not limited thereto. For example, the first optical adhesive 50 is an optically clear adhesive (OCA), or an optically clear resin (OCR), but not limited thereto. It is noted that the light-transmitting substrate 40 is not formed of solidification of the optical adhesive. Instead, the light-transmitting substrate 40 in the present application is a replacement for the optical adhesive. Therefore, an amount of usage of the expensive optical adhesive can be reduced, and cost for manufacturing the touch display device can be reduced.

The adhesive 60 is disposed on the top surface 2021 of the frame body 20. In a specific embodiment, the adhesive 60 can be solid glue including two release papers. In actual practice, the adhesive 60 is entirely spread on the top surface 2021.

The touch module 70 is fixed to one side of the light-transmitting substrate 40 which is opposite to the display surface 101 by the second optical adhesive, and the touch module 70 is fixed to the frame body 20 by the adhesive 60. In other words, the touch module 70 is fixed to the light-transmitting substrate 40 and the frame body 20 by the second optical adhesive and the adhesive 60, respectively. The top covering portion 202, the light-transmitting substrate 40, and the display module 10 are correspondingly disposed within a range of orthographic projection of one side of the touch module toward the light-transmitting substrate 40. That is, the touch module 70 entirely covers the side of the frame body 20 and the display module 10. The light-transmitting substrate 40 and the display surface 101 are entirely covered by the touch module 70.

It is noted that a refractive index of the light-transmitting substrate 40 is substantially the same as a refractive index of a touch panel of the touch module 70. Therefore, there will be no afterimages or other problems of image presentation when the technical personnel is, from one side of the touch module 70 through the light-transmitting substrate 40, seeing the image displayed on the display surface 101. In actual practice, a percentage difference between the refractive index of the touch module and the refractive index of the light-transmitting substrate ranges from 0.1% to 5%

As shown in FIG. 4, in actual manufacturing process, the manufacturer can fix the light-transmitting substrate 40 to one side of the touch module 70 by using the second optical adhesive 80, and then dispose the adhesive 60 on the top surface 2021 of the frame body 20, and lastly spread or attach the first optical adhesive 50 on one side of the light-transmitting substrate 40 which is opposite to the touch module 70, and use related equipment (e.g. all kinds of vacuum filming equipment) to fixedly dispose the light-transmitting substrate 40 on the display surface 101 via the first optical adhesive 50. In some special cases, the first optical adhesive 50 can also be spread or attach on the display surface 101, and the related equipment can be used to connect, via the first optical adhesive 50, the light-transmitting substrate 40 and the display module 10 covered by the frame body 20.

In actual practice, the adhesive 60, for example, can be solid glue. When the solid glue is used as the adhesive 60, the solid glue can include two release papers. The technical personnel can firstly rip one of the release papers off to expose an adhesive layer of the solid glue such that the adhesive layer is able to be attached to the top surface 2021 of the top covering portion 202 (as shown in FIG. 3). Afterwards, the technical personnel can rip off the other one of the release papers of the adhesive 60 when the technical personnel want to connect the touch module 70 of the light-transmitting substrate 40 and the display module 10 covered by the frame body 20. Moreover, the adhesive 60 can be liquid glue in other embodiments of the present application, but not limited thereto.

It is understood that the adhesive 60 disposed on the top surface 2021 of the top covering portion 202 has a thickness D1 in the direction of the normal line of the display surface 101 (i.e. Z-axis direction shown in FIG. 3). The light-transmitting substrate 40 is higher than the top surface 2021 of the top covering portion 202 with a height H1. The thickness D1 of the adhesive 60 in the direction of the normal line of the display surface 101 is greater than the height H1 of the light-transmitting substrate 40. That is, if the light-transmitting substrate 40 in the direction of the normal line of the display surface 101 is higher than the top surface 2021 of the frame body 20 with a predetermined height, the thickness D1 of the adhesive 60 in the direction of the normal line of the display surface 101 is greater than or equal to the predetermined height.

It is noted that a sum of a thickness D2 of the light-transmitting substrate 40 in the direction of the normal line of the display surface 101 and a thickness D3 of the first optical adhesive 50 in the direction of the normal line of the display surface 101 is smaller than or equal to a sum of the thickness D1 of the adhesive 60 in the direction of the normal line of the display surface 101 and a depth D4 of the accommodating groove SP in the direction of the normal line of the display surface 101. A mathematic formula as described above is presented as: $D2+D3 \leq D1+D4$. For example, the thickness D2 of the light-transmitting substrate 40 in the direction of the normal line of the display surface 101 is greater than or equal to 0.1 mm, the thickness D1 of the adhesive 60 in the direction of the normal line of the display surface 101 ranges from 0.05 mm to 1.0 mm, and the depth D4 of the accommodating groove SP (shown in FIG. 4) in the direction of the normal line of the display surface 101 is greater than or equal to 0.1 mm.

A sum of the thickness D2 of the light-transmitting substrate 40 in the direction of the normal line of the display surface 101 and a thickness D5 of the second optical adhesive 80 in the direction of the normal line of the display surface 101 is smaller than or equal to a sum of the thickness D1 of the adhesive 60 in the direction of the normal line of the display surface 101 and the depth D4 of the accommodating groove SP in the direction of the normal line of the display surface 101. A mathematic formula as described above is presented as: $D2+D5 \leq D4+D1$. For example, the thickness D2 of the light-transmitting substrate 40 in the direction of the normal line of the display surface 101 is greater than or equal to 0.1 mm, the thickness D5 of the second optical adhesive 80 in the direction of the normal line of the display surface 101 ranges from 0.05 mm to 1.0 mm, and the depth D4 of the accommodating groove SP in the direction of the normal line of the display surface 101 is greater than or equal to 0.1 mm.

A sum of the thickness D2 of the light-transmitting substrate 40 in the direction of the normal line of the display surface 101 and the thickness D5 of the second optical adhesive 80 in the direction of the normal line of the display surface 101 is greater than or equal to the depth D4 of the accommodating groove SP in the direction of the normal line of the display surface 101. A mathematic formula as described above is presented as: $D2+D5 \geq D4$. For example, the thickness D2 of the light-transmitting substrate 40 in the direction of the normal line of the display surface 101 is greater than or equal to 0.1 mm.

It should be understood that in actual practice, a dimensional tolerance in production of the depth D4 of the accommodating groove SP formed by the display surface 101 and the frame body 20 is substantially equal to the thickness D2 of the light-transmitting substrate 40 in the direction of the normal line of the display surface 101. Therefore, if assuming that the thickness D2 of the light-transmitting substrate 40 is equal to the depth D4 of the accommodating groove SP when the light-transmitting substrate 40 is produced, it could be difficult to correctly dispose the light-transmitting substrate 40 into the accommodating groove SP, thereby incurring the problem that the touch module 70 cannot be completely and evenly attached to one side of the display module 10 covered by the frame body 20. Thus, by virtue of the protrusion of the light-transmitting substrate 40 from the top surface 2021 of the frame body 20 of the touch display device A of the present application when the light-transmitting substrate 40 is disposed into the accommodating groove SP, the aforesaid problem can be solved.

It should be mentioned that in FIG. 4 solid glue is taken as an example of the adhesive 60 and the adhesive 60 is typically in the shape of a ring, but the shape and the amount of the adhesive 60 are not limited thereto. For example, the adhesive 60 can also be a four-strip structure and correspondingly attached to top surface 2021 of the top covering portion 202. As a result, the technical personnel can make a user-operating surface of the touch module 70 to be substantially parallel to the display surface 101 by adjusting the thickness of the adhesive 60 in different positions based on the surface evenness of the light-transmitting substrate 40, the display surface 101 and the frame body 20.

As shown in FIG. 3, in actual practice, an adhesive strength of the adhesive 60 is higher than an adhesive strength of the first optical adhesive 50, and the adhesive strength of the adhesive 60 is higher than an adhesive strength of the second optical adhesive 80. For example, by applying a 90-degree peel adhesion test (based on ASTM D3330) or a Normal Tenslle test (based on ASTM D-897) on the first adhesive 50, the adhesive 60, and the second adhesive 80, the adhesive strength of the adhesive 60 ranges from 50N/25 millimeter (mm) to 100N/25 mm, the adhesive strength of the second optical adhesive 80 ranges from 15N/25 mm to 40N/25 mm, and the adhesive strength of the first optical adhesive 50 is smaller than or equal to 5N/25 mm. The abovementioned statistics may be slightly different in its testing value or its measurement unit when different adhesive strength measurement apparatuses (e.g. a breadboard, a pressing apparatus, a peeling device, or a lapping machine) and methods (a peeling method, an overlapping method, or a lapping method) are applied. As long as the adhesive strength of the adhesive 60 is higher than the adhesive strength of the first optical adhesive 50, and the adhesive strength of the adhesive 60 is higher than the adhesive strength of the second optical adhesive 80, any modifications and variations should still be regarded as within the scope of the embodiments of the present application.

Referring to FIG. 5, a schematic view of the touch display device after cutting according to the first embodiment of the present disclosure is shown. By virtue of "the adhesive strength of the adhesive 60 is higher than the adhesive strength of the first optical adhesive 50" and "the adhesive strength of the adhesive 60 is higher than the adhesive strength of the second optical adhesive 80," the maintenance personnel can use a cutter to cut at a cut-in point between the touch module 70 and the adhesive 60, and to easily separate the touch module 70 and the display module 10. In actual practice, before cutting, the maintenance personnel may firstly place the display device A in the refrigerator for embrittlement of the adhesive 60 and the first optical adhesive 50, such that the touch module 70 and the adhesive 60 can be easily cut. It is noted that, in the embodiments that the light-transmitting substrate 40 are made of glass or other related materials, since the second optical adhesive 80 is further configured between the touch module 70 and the light-transmitting substrate 40, the technical personnel or automatic machine can cut the adhesive 60 or the second optical adhesive 80 by using the cutter at a cut-in point from a contact of the touch module 70 and the adhesive 60 downward in a distance equal to the thickness of the second optical adhesive 80. In other words, despite of a slight deviation (range of error) of the cut-in point of the cutter, the touch module 70 and the display module 10 can still be separated.

It is should be mentioned that in actual practice as shown in FIG. 3, in order to easily cut the adhesive 60 and the second optical adhesive 80, the thickness D1 of the adhesive 60 in the direction of the normal line of the display surface 101 can be configured to range from 0.2 mm to 3 mm, and the thickness D5 of the second optical adhesive 80 in the direction of the normal line of the display surface 101 can be configured to range from 0.05 mm to 0.25 mm.

Second Embodiment

Figure 6:
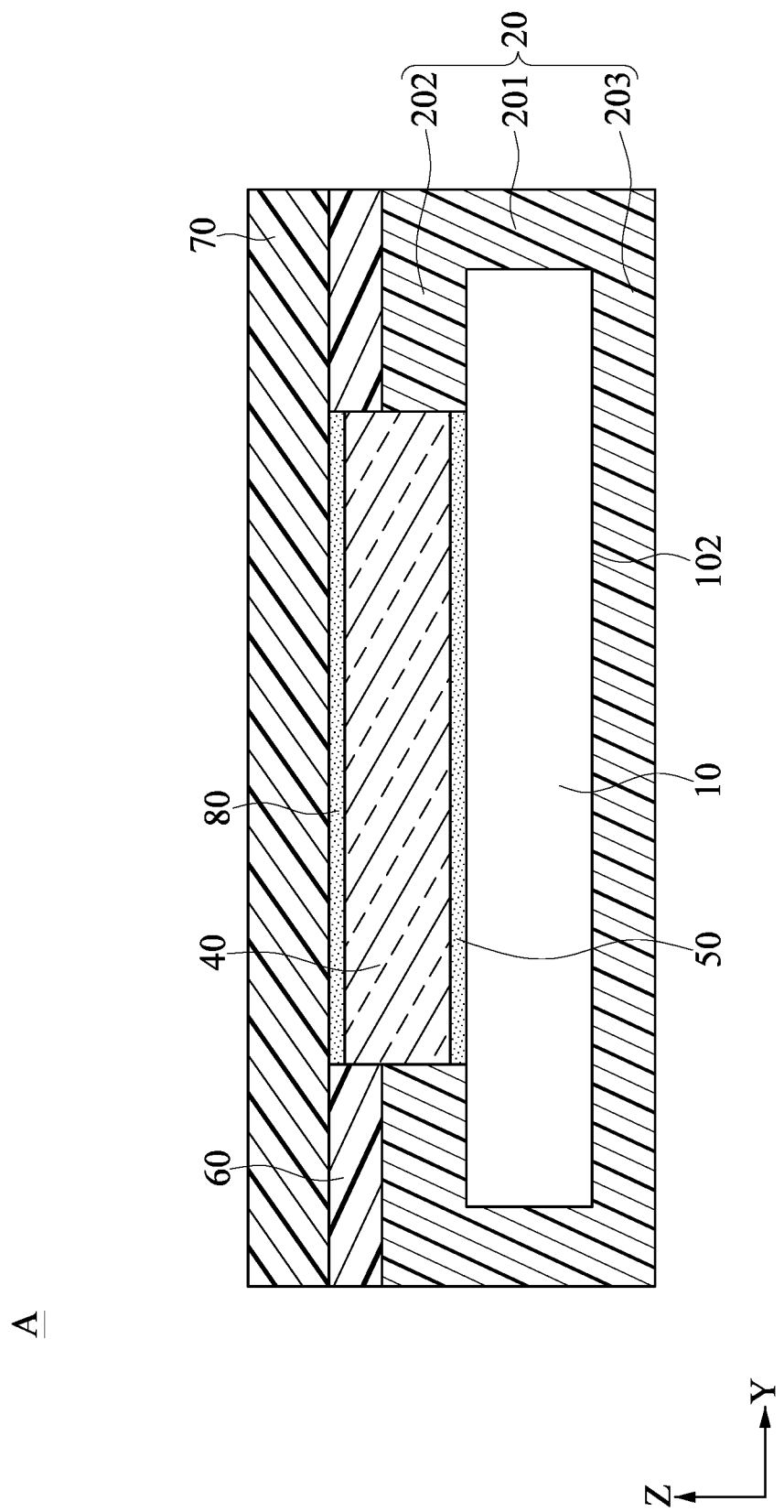
FIG. 6 is a cross-sectional view of the touch display device according to a second embodiment of the present disclosure.

Referring to FIG. 6, a cross-sectional view of the touch display device according to a second embodiment of the present disclosure (substantially a cross-sectional view taken along line III of FIG. 1) is shown. In this embodiment, the frame body 20 further includes a bottom covering portion 203 and an electrical connection module 30. The bottom covering portion 203 is connected to the surrounding covering portion 201. The bottom covering portion 203 covers a bottom of the display module 10. The surrounding covering portion 201, the top covering portion 202 and the bottom covering portion 203 can be a one-piece structure to cover the display module 10 by related shaping process. In the embodiment that the frame body 20 does not include the bottom covering portion 203, the entire frame body 20 is in the shape of a hollow rectangular cylinder. On the other hand, in the embodiment that the frame body 20 includes the bottom covering portion 203, the entire frame body 20 is in the shape of a rectangular cylinder having a side formed with a receiving groove.

Third Embodiment

Figure 7:
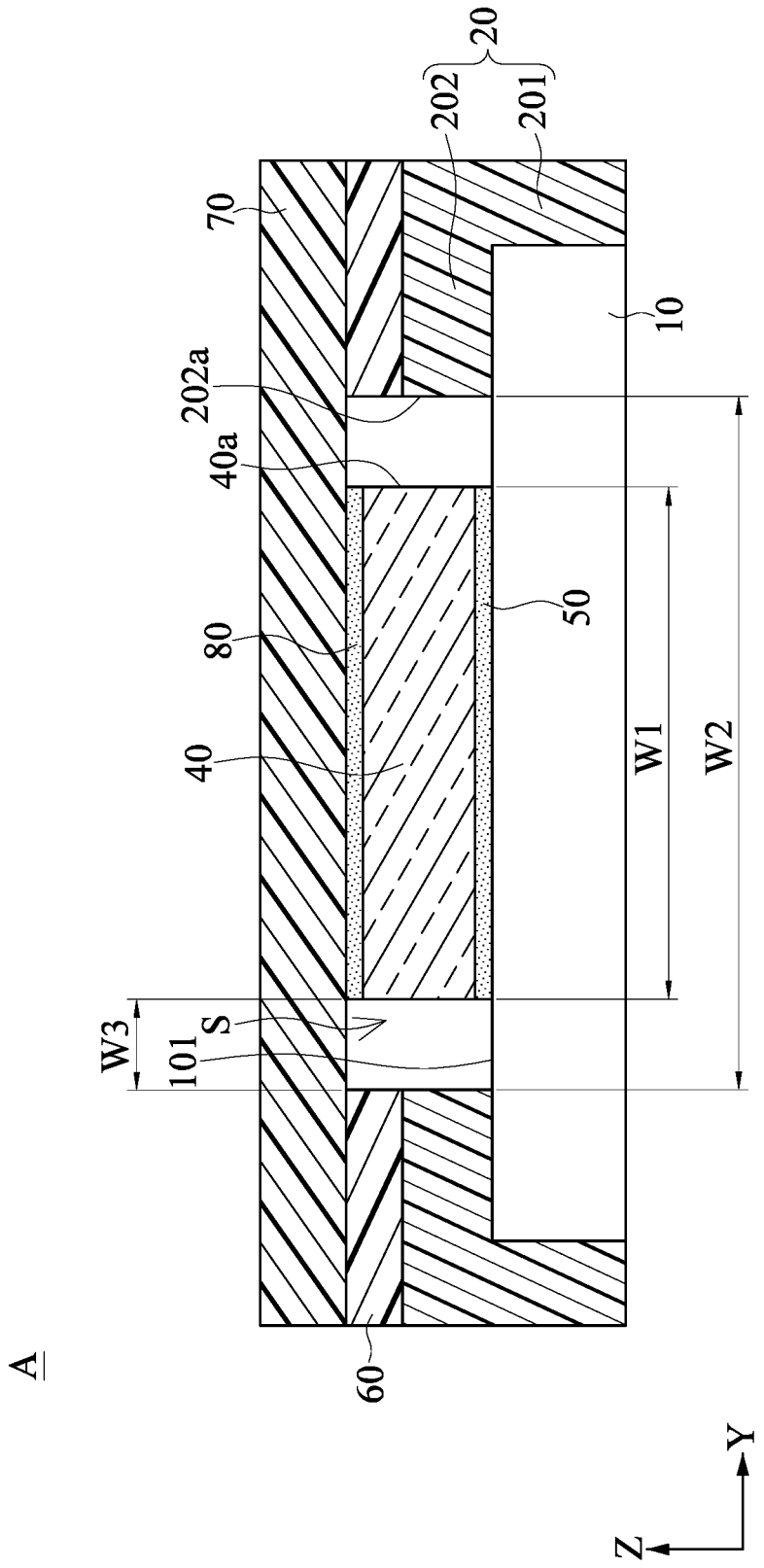
FIG. 7 is a cross-sectional view of the touch display device according to a third embodiment of the present disclosure.
Figure 8:
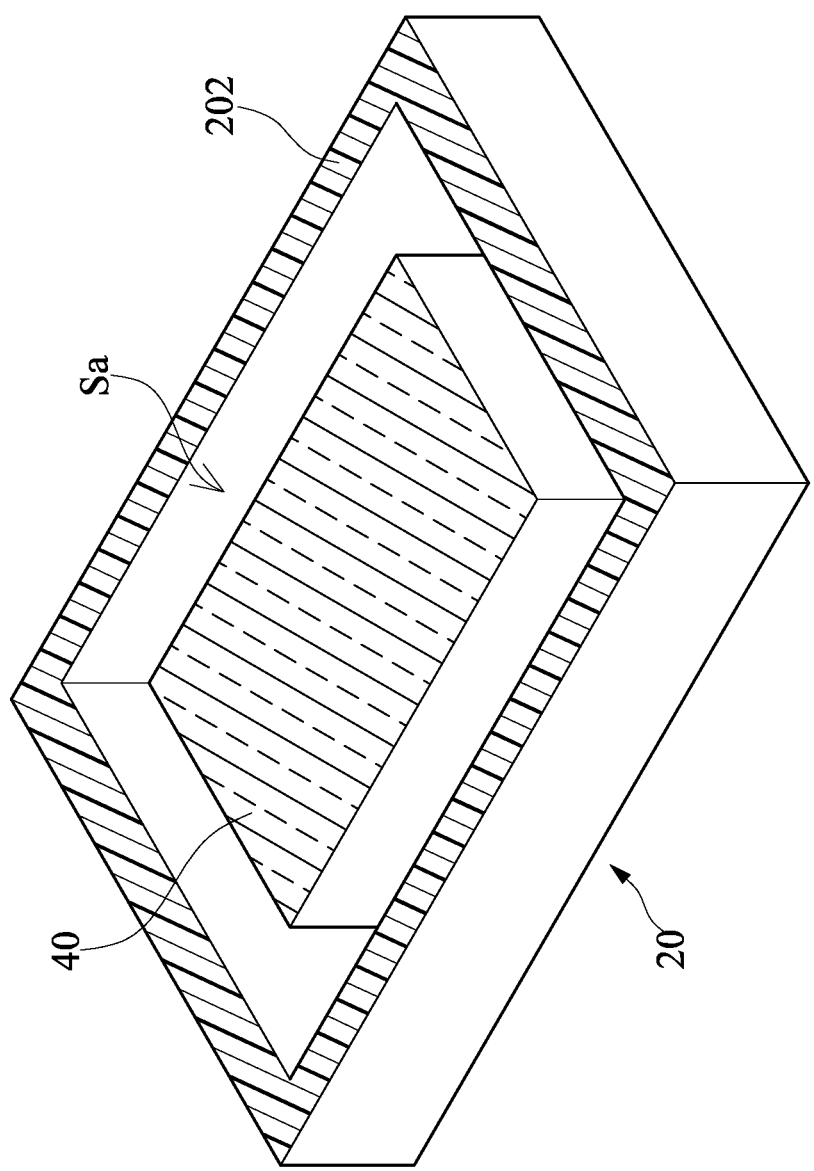
FIG. 8 is a cross-sectional view taken from another perspective of the touch display device according to the third embodiment of the present disclosure.

Referring further to FIG. 7 and FIG. 8, FIG. 7 is a cross-sectional view of the touch display device according to a third embodiment of the present disclosure (substantially a cross-sectional view taken along line III of FIG. 1), and FIG. 8 is a cross-sectional view taken from another perspective of the touch display device according to the third embodiment of the present disclosure. The major difference between this embodiment and the abovementioned embodiments resides in that: an outer edge 40a of the light-transmitting substrate 40 and an inner edge 202a of the top covering portion 202 jointly define a predetermined gap S therebetween. In other words, a width W1 of the light-transmitting substrate 40 in a Y-direction (as shown in FIG. 7) is smaller than a width W2 of the accommodating groove SP in the Y-direction.

Referring to FIG. 8, when the touch module 70 configured with the light-transmitting substrate 40 thereon is fixed to the frame body 20 and meanwhile the light-transmitting substrate 40 is correspondingly placed in the accommodating groove SP, the accommodating groove SP will not be filled with the light-transmitting substrate 40, and an annular groove Sa will be formed between the touch module 70 and the display surface 101. In actual practice, the present application may not be limited to have the annular groove Sa, and can have strip-shaped grooves independent from one another. By virtue of the annular groove Sa, there will be a room for a thermal expansion of the light-transmitting substrate 40 when the light-transmitting substrate 40 is heated. In other words, in the embodiment that the predetermined gap S is not formed between the light-transmitting substrate 40 and the top covering portion 202, the light-transmitting substrate 40 may expand to touch against the frame body 20 if there is no room for the thermal expansion of the light-transmitting substrate 40, incurring damage of the frame body 20 or the display module 10. Moreover, by virtue of the predetermined gap S and the annular groove Sa, although the transmitting substrate 40 has an unexpected range of error in production, the light-transmitting substrate 40 may still have opportunities to be disposed in the accommodating groove SP. In actual practice, a distance W3 between the outer edge 40a of the light-transmitting substrate 40 and the inner edge 202a of the top covering portion 202 is smaller than or equal to 0.3 mm. Certainly, the distance W3 between the outer edge 40a of the light-transmitting substrate 40 and the inner edge 202a of the top covering portion 202 may be changed based on different sizes of the touch display device A.

Fourth Embodiment

Figure 9:
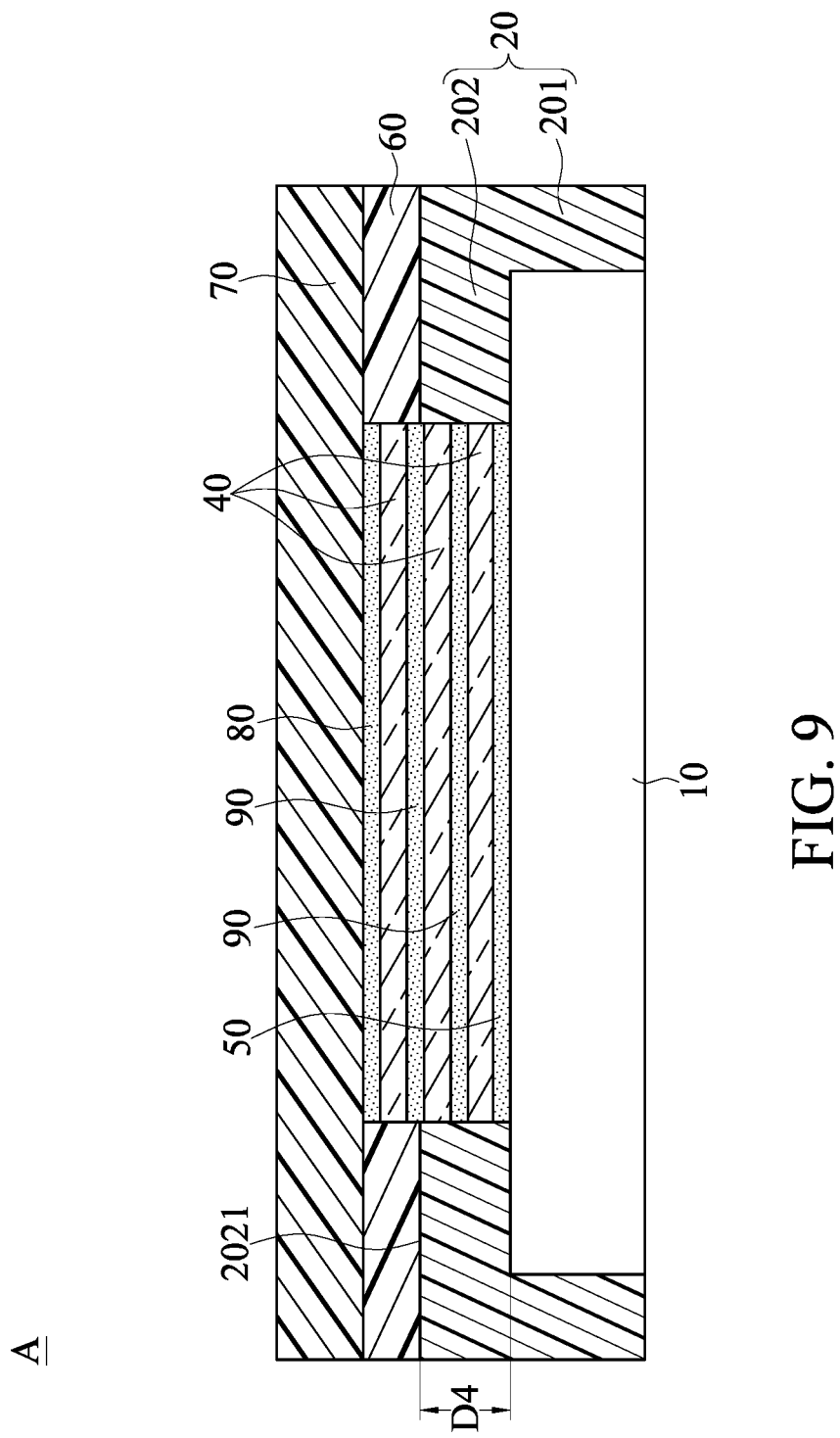
FIG. 9 is a cross-sectional view of the touch display device according to a fourth embodiment of the present disclosure.

Referring to FIG. 9, a cross-sectional view of the touch display device according to a fourth embodiment of the present disclosure is shown. The major difference between this embodiment and the abovementioned embodiments resides in that: the touch display device A can include a plurality of the light-transmitting substrates 40. The plurality of the light-transmitting substrates 40 are connected to one another by a third optical adhesive 90. The light-transmitting substrates 40 are fixedly disposed between the touch module 70 and the display surface 101. At least a portion of at least one of the light-transmitting substrates 40 is higher than the top surface 2021. The third optical adhesive can be optically clear resin (OCR) or optically clear adhesive (OCA) for instance, but not limited thereto.

In actual practice, the technical personnel (who attach the touch module 70 to the display module) can customize the light-transmitting substrates 40 with different thickness. When the depth D4 of the accommodating groove SP in the direction of the normal line of the display surface 101 is greater than expected, the technical personnel can add another light-transmitting substrate 40 that has the similar thickness by the third optical adhesive 90. In other embodiments, the technical personnel can decide an amount of the light-transmitting substrates 40 based on the depth D4 of the accommodating groove SP in the direction of the normal line of the display surface 101.

In other words, by virtue of the plurality of the light-transmitting substrates 40 of the present application, the technical personnel can adjustably customize the amount of the light-transmitting substrates 40 based on the depth D4 of the accommodating groove SP in the direction of the normal line of the display surface 101. Therefore, the light-transmitting substrates 40 are guaranteed to be connected to the touch module 70 and the display surface 101. As a result, a massive usage of the optical glue for ensuring the light-transmitting substrates 40 to be in contact with the display surface 101 can be prevented, and thus the cost can be decreased.

In actual production process, due to multiple causes such as the production tolerance of the frame body 20 or the production tolerance of the display module 10, the depth D4 of the accommodating groove SP in the direction of the normal line of the display surface 101 may be different from an expected depth. If the predetermined light-transmitting substrates 40 are connected to the display module 10 covered by the frame body 20, there could be an air layer formed between the light-transmitting substrates 40 and the display surface 101, incurring ghost images (multiple overlapping images) when a user watches the images displayed on the display surface 101 via the touch module 70. Therefore, by virtue of the plurality of the light-transmitting substrates 40 of the present application, the abovementioned problem of the ghost image can be effectively prevented.

Fifth Embodiment

Figure 10:
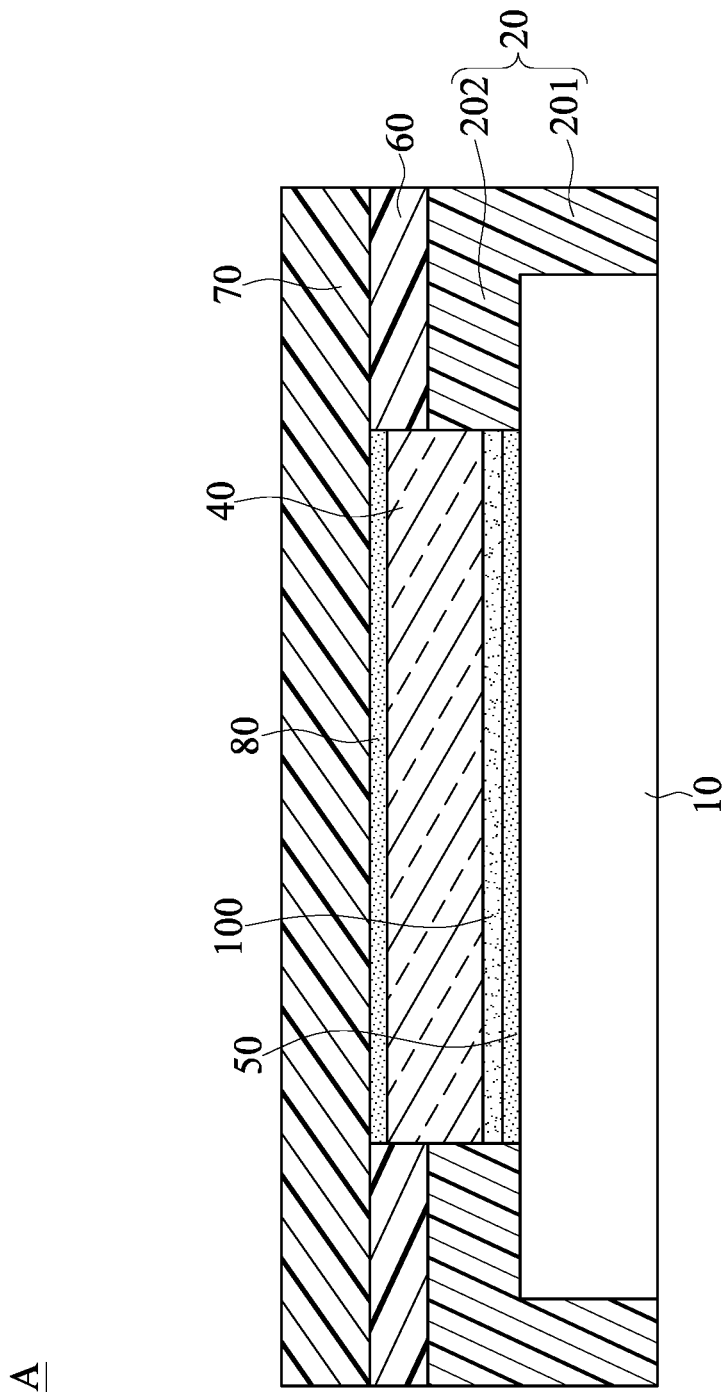
FIG. 10 is a cross-sectional view of the touch display device according to a fifth embodiment of the present disclosure.

Referring to FIG. 10, a cross-sectional view of the touch display device according to a fifth embodiment of the present disclosure is shown. The major difference between this embodiment and the abovementioned embodiments resides in that: a functional unit 100 can be disposed between the light-transmitting substrate 40 and the display surface 101. The functional unit 100 is selected by one of an anti-electromagnetic interference (anti-EMI) plate, a polarizer and a micro-louver. Certainly, in actual practice, the functional unit 100 can also be disposed between the light-transmitting substrate 40 and the touch module 70.

Sixth Embodiment

Figure 11:
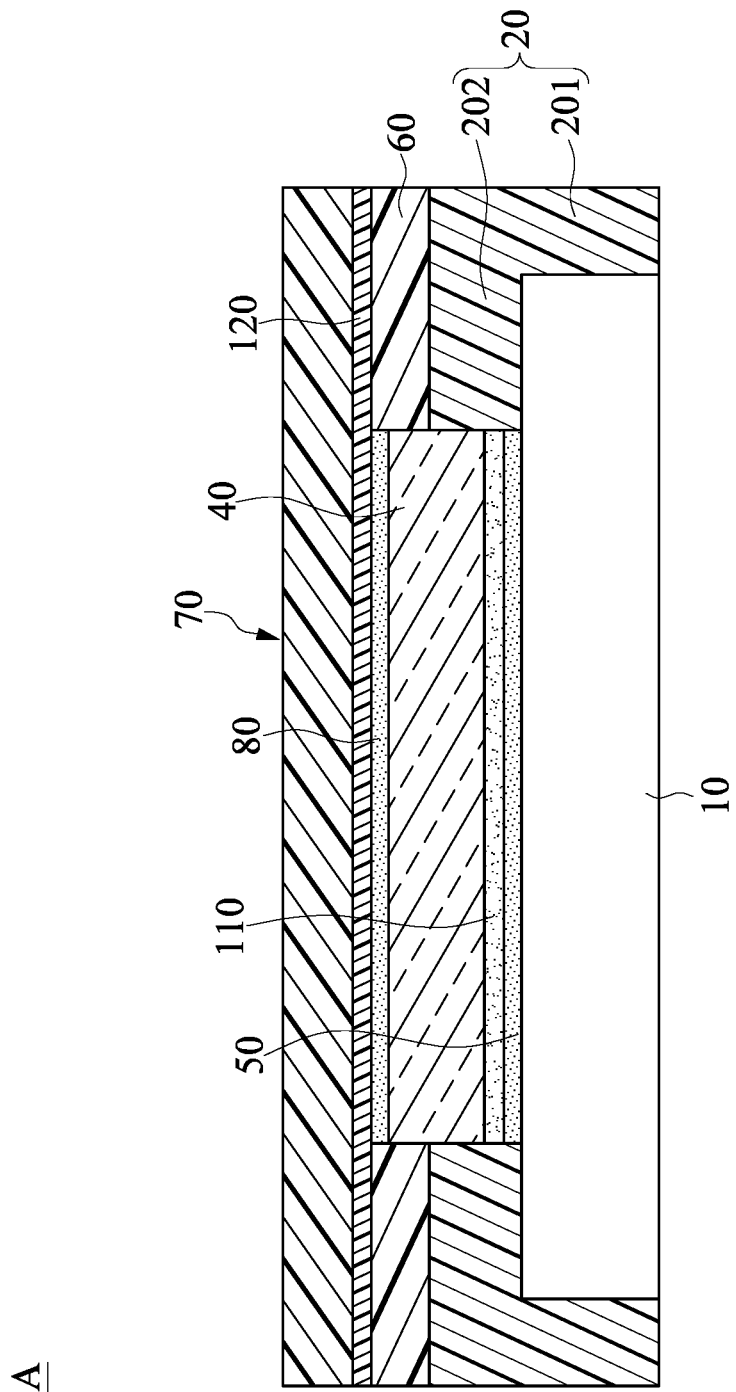
FIG. 11 is a cross-sectional view of the touch display device according to a sixth embodiment of the present disclosure.

Referring to FIG. 11, a cross-sectional view of the touch display device according to a sixth embodiment of the present disclosure is shown. The major difference between this embodiment and the abovementioned embodiments resides in that: the touch display device A may further includes a first indium tin oxide (ITO) layer 110 and a second ITO layer 120. The first ITO layer 110 is formed on one side of the light-transmitting substrate 40 which faces the display surface 101. The second ITO layer 120 is formed in the touch module 70. The first ITO layer 110 and the second ITO layers 120 cooperate with each other to correspondingly generate an X axis position signal and a Y axis position signal when the touch module 70 is touched. In other words, the light-transmitting substrate 40, the first ITO layer 110 in cooperation with the touch module 70 can be seen as a touch device which can provide a complete touch and indication function.

Seventh Embodiment

Figure 12:
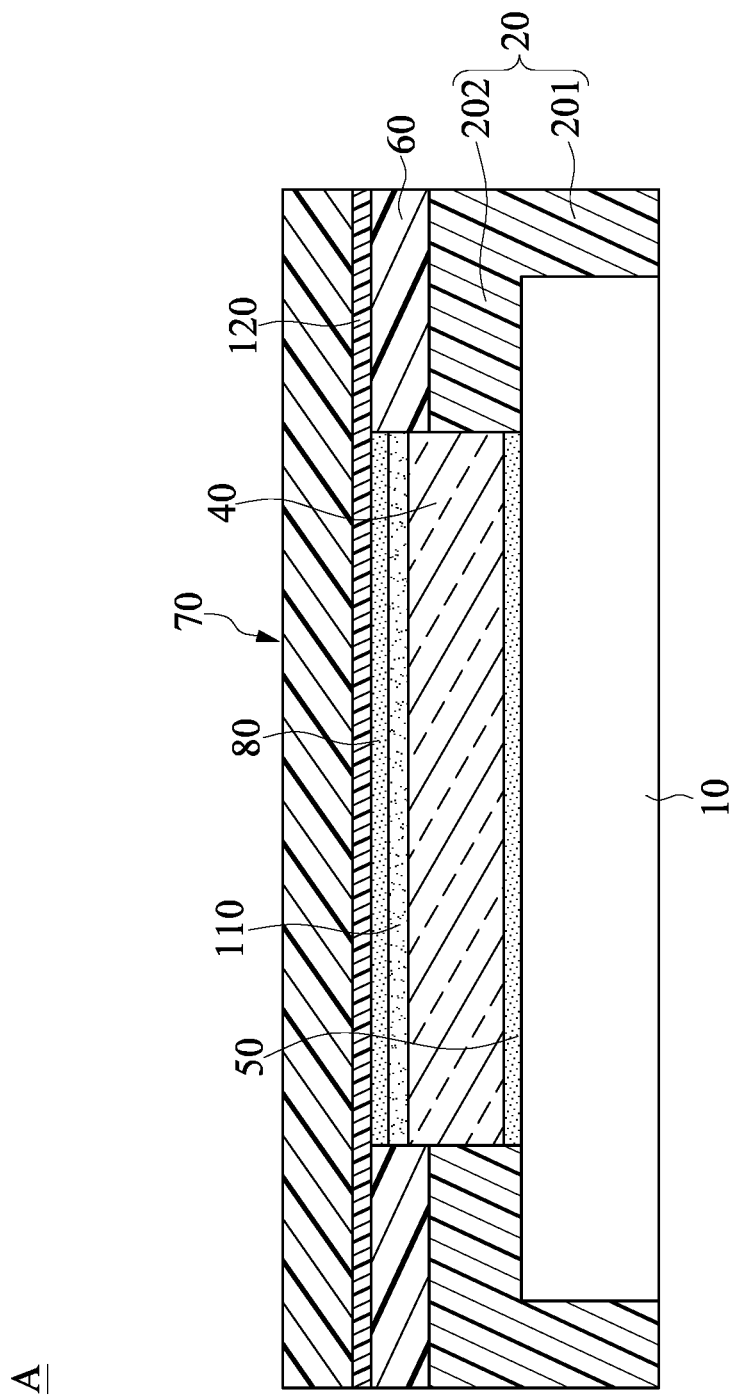
FIG. 12 is a cross-sectional view of the touch display device according to a seventh embodiment of the present disclosure.

Referring to FIG. 12, a cross-sectional view of the touch display device according to a seventh embodiment of the present disclosure is shown. The major difference between this embodiment and the abovementioned embodiments resides in that: the first ITO layer 110 is formed on one side of the light-transmitting substrate 40 which is distal from the display surface 101. The first ITO layer 110 is correspondingly disposed between the light-transmitting substrate 40 and the second optical adhesive 80. Specifically, in actual production process, the technical personnel can firstly configure the first STO layer 110 on one side of the light-transmitting substrate 40, and then attach the light-transmitting substrate 40 that has the first STO layer 110 to the touch module 70 by the second optical adhesive 80. Certainly, the first ITO layer 110 of the light-transmitting substrate 40 and the second ITO layer 120 of the touch module 70 are configured to be relative and effective to each other, such that the first ITO layer 110 and the second ITO layer 120 can respectively generate the X axis position signal and the Y axis position signal when the touch module 70 is touched. In other embodiments, when the touch module 70 is touched, the first ITO layer 110 can also generate the Y axis position signal, and second ITO layer 120 can generate the X axis position signal.

Eighth Embodiment

Figure 13:
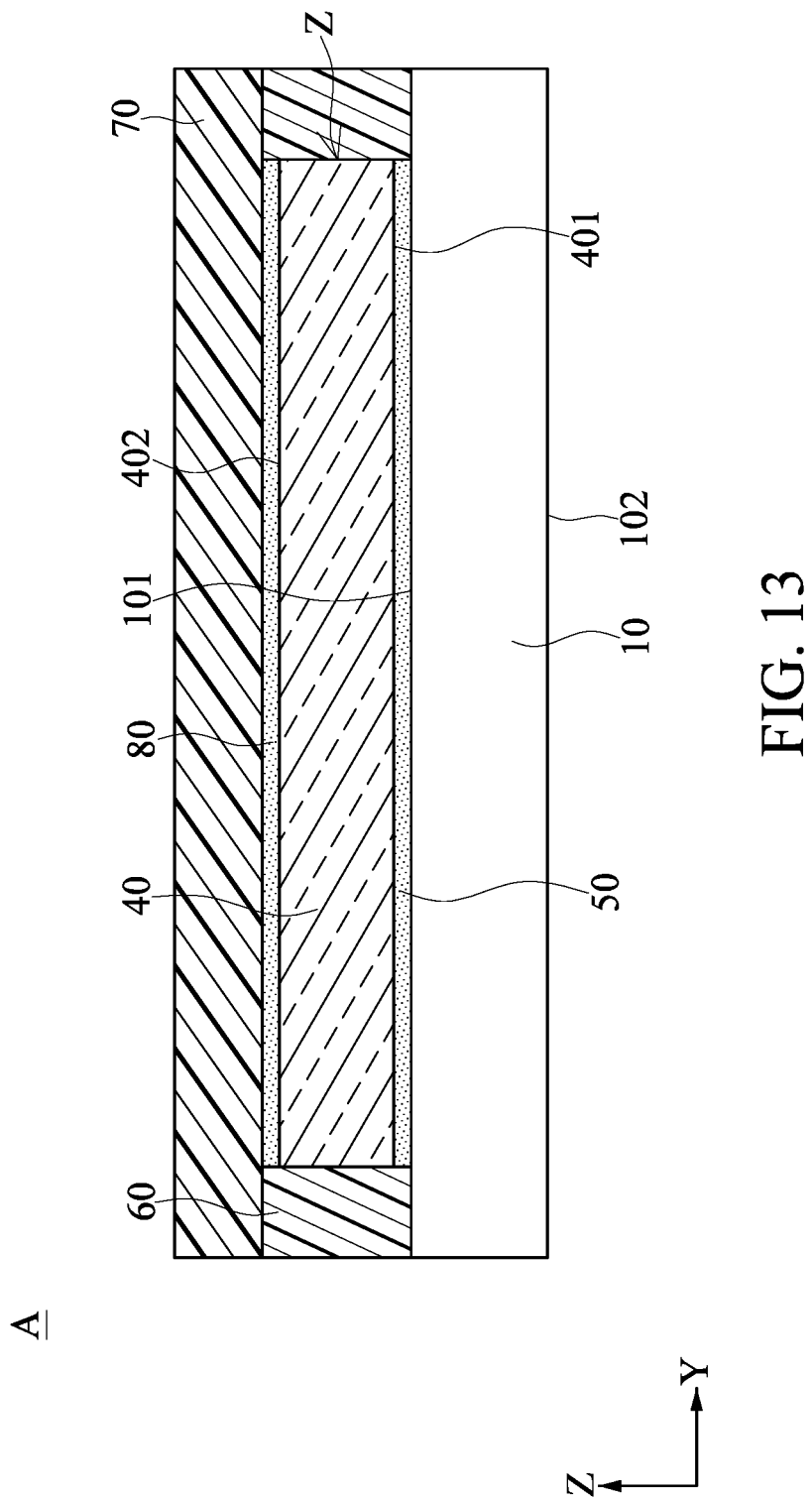
FIG. 13 is a cross-sectional view of the touch display device according to an eighth embodiment of the present disclosure.

Referring to FIG. 13, a cross-sectional view of the touch display device according to an eighth embodiment of the present disclosure is shown. The major difference between this embodiment and the abovementioned embodiments resides in that: the touch display device A can have no frame body 20. Instead, the touch module 70 is fixedly configured on the display surface 101 by the adhesive 60. The adhesive 60, the touch module 70 and the display surface 101 jointly define an accommodating space Z between the display module 10 and the touch module 70. That is, the adhesive 60 is an annular structure. The light-transmitting substrate 40 is disposed in the accommodating space Z. One side 401 of the light-transmitting substrate 40 is fixed to the display surface 101 of the display module 10 by the first optical adhesive 50, and the other side 402 of the light-transmitting substrate 40 is fixed to the touch module 70 by the second optical adhesive 80.

It is understood that the light-transmitting substrate 40 in FIG. 13 of the present embodiment is configured to substantially fill the accommodating space Z, but not limited thereto. In other embodiments, the light-transmitting substrate 40 should not be necessary to fill the accommodating space Z, as shown in FIG. 7 of the present application.

In conclusion, conventional industrial used touch display device applies a huge amount of the optical glue. On the contrary, the touch display device of the present application applies the light-transmitting substrate to replace the optical glue such that the usage of the optical glue can be effectively decreased. Moreover, conventional industrial used touch display device applies a huge amount of the liquid OCA for connecting the components. However, since the thickness of the liquid OCA is difficult to be controlled, a Mura defect may be incurred in the finalized product. On the contrary, the touch display device of the present application applies the light-transmitting substrate such that the chance of incurring the Mura defect can be effectively decreased.

Furthermore, by virtue of "the adhesive strength of the adhesive ranges from 50N/25 mm to 100N/25 mm", "the adhesive strength of the second optical adhesive ranges from 15N/25 mm to 40N/25 mm", and "the adhesive strength of the first optical adhesive is smaller than or equal to 5N/25 mm" of the touch display device of the present application, the display module and the touch module can be easily disassembled by the maintenance personnel. Therefore, the maintenance personnel can only replace the damaged touch module or the display module and keep the undamaged display module or the touch module during maintenance service.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touch display device, comprising:
a display module powered to operate independently, the display module having a display surface and a bottom surface opposite to the display surface, wherein when the display module is powered and operating, the display surface displays an image;
a touch module fixed to the display surface by an adhesive, wherein the adhesive, the touch module and the display surface jointly define an accommodating space between the display module and the touch module; and
a light-transmitting substrate disposed in the accommodating space, one side of the light-transmitting substrate being fixed to the display surface by a first optical adhesive, the other side of the light-transmitting substrate being fixed to the touch module by a second optical adhesive, wherein the light-transmitting substrate is not formed of solidified optical adhesive;
wherein an adhesive strength of the adhesive is higher than an adhesive strength of the first optical adhesive, the adhesive strength of the adhesive is higher than an adhesive strength of the second optical adhesive, the adhesive strength of the adhesive ranges from 50N/25 millimeter (mm) to 100N/25 mm, the adhesive strength of the second optical adhesive ranges from 15N/25 mm to 40N/25 mm, and the adhesive strength of the first optical adhesive is smaller than or equal to 5N/25 mm;
wherein a percentage difference between a refractive index of the touch module and a refractive index of the light-transmitting substrate ranges from 0.1% to 5%.

2. The touch display device according to claim 1, wherein the display module includes a display and a frame body, one side of the display is the display surface, the frame body is fixed to a periphery of the display, the frame body includes a surrounding covering portion and a top covering portion, the surrounding covering portion covers the periphery of the display, the top covering portion is connected to the surrounding covering portion, the top covering portion is correspondingly disposed on the one side of the display surface of the display, and the top covering portion and the display surface jointly define an accommodating groove;
wherein the adhesive is fixed to one side of the surrounding covering portion, and the touch module, the adhesive, the top covering portion and the display surface jointly define an accommodating space;
wherein a portion of the light-transmitting substrate which is distal from the display surface is higher than a top surface of the top covering portion, the top surface is disposed on one side of the top covering portion which is distal from the display surface;
wherein the light-transmitting substrate is higher than the top surface by a predetermined height in a direction of a normal line of the display surface; and
wherein a thickness of the adhesive in the direction of the normal line of the display surface is greater than or equal to the predetermined height.

3. The touch display device according to claim 2, wherein a sum of a thickness of the light-transmitting substrate in the direction of the normal line of the display surface and a thickness of the first optical adhesive in the direction of the normal line of the display surface is smaller than or equal to a sum of the thickness of the adhesive in the direction of the normal line of the display surface and a depth of the accommodating groove in the direction of the normal line of the display surface,
wherein the thickness of the light-transmitting substrate in the direction of the normal line of the display surface is greater than or equal to 0.1 mm, the thickness of the adhesive in the direction of the normal line of the display surface ranges from 0.05 mm to 1.0 mm, and the depth of the accommodating groove in the direction of the normal line of the display surface is greater than or equal to 0.1 mm.

4. The touch display device according to claim 2, wherein a sum of a thickness of the light-transmitting substrate in the direction of the normal line of the display surface and a thickness of the second optical adhesive in the direction of the normal line of the display surface is smaller than or equal to a sum of the thickness of the adhesive in the direction of the normal line of the display surface and a depth of the accommodating groove in the direction of the normal line of the display surface,
wherein the thickness of the light-transmitting substrate in the direction of the normal line of the display surface is greater than or equal to 0.1 mm, the thickness of the adhesive in the direction of the normal line of the display surface ranges from 0.05 mm to 1.0 mm, and the depth of the accommodating groove in the direction of the normal line of the display surface is greater than or equal to 0.1 mm.

5. The touch display device according to claim 2, wherein an outer edge of the light-transmitting substrate and an inner edge of the top covering portion jointly define a predetermined gap therebetween, and a distance between the outer edge of the light-transmitting substrate and the inner edge of the top covering portion is smaller than or equal to 0.3 mm.

6. The touch display device according to claim 2, wherein the frame body further includes a bottom covering portion and an electrical connection module, the bottom covering portion is connected to the surrounding covering portion, and the bottom covering portion covers a bottom of the display module;
wherein the electrical connection module includes at least one electrical connector, and the display module is electrically connected to an external control device via the at least one electrical connector so as to receive an electric power and an image signal provided from the external control device;
wherein a functional unit is disposed between the light-transmitting substrate and the display surface or between the light-transmitting substrate and the touch module, and the functional unit is one of an anti-electromagnetic interference (anti-EMI) plate, a polarizer and a micro-louver.

7. The touch display device according to claim 1, wherein the touch display device includes a plurality of the light-transmitting substrates, the plurality of the light-transmitting substrates are connected to one another by a third optical adhesive, and an adhesive strength of the third optical adhesive ranges from 15N/25 mm to 40N/25 mm.

8. A touch display device, comprising:
a display module powered to operate independently, the display module having a display surface and a bottom surface opposite to the display surface, wherein when the display module is powered and operating, the display surface displays an image;
a frame body fixed to a periphery of the display, wherein the frame body includes a surrounding covering portion and a top covering portion, the surrounding covering portion covers the periphery of the display, the top covering portion is connected to the surrounding covering portion, the top covering portion is correspondingly disposed on the one side of the display surface of the display, and the top covering portion and the display surface jointly define an accommodating groove;
a light-transmitting substrate fixed to the display surface by a first optical adhesive, the light-transmitting substrate being correspondingly disposed in the accommodating groove, a portion of the light-transmitting substrate which is distal from the display surface being higher than a top surface of the top covering portion which is distal from the display surface, the light-transmitting substrate in a direction of a normal line of the display surface being higher than the top surface with a predetermined height;
an adhesive disposed on the top surface, wherein a thickness of the adhesive in a direction of the normal line of the display surface is greater than or equal to the predetermined height;
a first indium tin oxide (ITO) layer formed on one side of the light-transmitting substrate which faces the display surface or one side of the light-transmitting substrate which is distal from the display surface;
at least one second optical adhesive disposed on the light-transmitting substrate, wherein a thickness of the at least one second optical adhesive in the direction of the normal line of the display surface is greater than or equal to the predetermined height; and
a touch module fixed to one side of the light-transmitting substrate which is distal from the display module by the second optical adhesive; the touch module being fixed to the top surface by the adhesive; the top covering portion, the light-transmitting substrate, and the display module being correspondingly disposed within a range of orthographic projection of one side of the touch module toward the light-transmitting substrate; the touch module including a second ITO layer; the first and second ITO layers cooperating with each other to correspondingly generate an X axis position signal and a Y axis position signal when the touch module is touched; a percentage difference between a refractive index of the touch module and a refractive index of the light-transmitting substrate ranging from 0.1% to 5%,
wherein an adhesive strength of the adhesive is higher than an adhesive strength of the first optical adhesive, the adhesive strength of the adhesive is higher than an adhesive strength of the second optical adhesive, the adhesive strength of the adhesive ranges from 50N/25 millimeter (mm) to 100N/25 mm, the adhesive strength of the second optical adhesive ranges from 15N/25 mm to 40N/25 mm, and the adhesive strength of the first optical adhesive is smaller than or equal to 5N/25 mm.

9. The touch display device according to claim 8, wherein a sum of a thickness of the light-transmitting substrate in the direction of the normal line of the display surface and a thickness of the first optical adhesive in the direction of the normal line of the display surface is smaller than or equal to a sum of the thickness of the adhesive in the direction of the normal line of the display surface and a depth of the accommodating groove in the direction of the normal line of the display surface, and
wherein the thickness of the light-transmitting substrate in the direction of the normal line of the display surface is greater than or equal to 0.1 mm, the thickness of the adhesive in the direction of the normal line of the display surface ranges from 0.05 mm to 1.0 mm, the depth of the accommodating groove in the direction of the normal line of the display surface is greater than or equal to 0.1 mm.

10. The touch display device according to claim 8, wherein a sum of a thickness of the light-transmitting substrate in the direction of the normal line of the display surface and a thickness of the second optical adhesive in the direction of the normal line of the display surface is smaller than or equal to a sum of the thickness of the adhesive in the direction of the normal line of the display surface and a depth of the accommodating groove in the direction of the normal line of the display surface, and
wherein the thickness of the light-transmitting substrate in the direction of the normal line of the display surface is greater than or equal to 0.1 mm, the thickness of the adhesive in the direction of the normal line of the display surface ranges from 0.05 mm to 1.0 mm, and the depth of the accommodating groove in the direction of the normal line of the display surface is greater than or equal to 0.1 mm.

11. The touch display device according to claim 8, wherein an outer edge of the light-transmitting substrate and an inner edge of the top covering portion jointly define a predetermined gap therebetween, and a distance between the outer edge of the light-transmitting substrate and the inner edge of the top covering portion is smaller than or equal to 0.3 mm.

12. The touch display device according to claim 8, wherein the touch display device includes a plurality of the light-transmitting substrates, the plurality of the light-transmitting substrates are connected to one another by a third optical adhesive, and an adhesive strength of the third optical adhesive ranges from 15N/25 mm to 40N/25 mm.

13. The touch display device according to claim 8, wherein the frame body further includes a bottom covering portion and an electrical connection module, and the bottom covering portion is connected to the surrounding covering portion, the bottom covering portion covers a bottom of the display module;
wherein the electrical connection module includes at least one electrical connector, and the display module is electrically connected to an external control device via the at least one electrical connector so as to receive an electric power and an image signal provided from the external control device; and
wherein a functional unit is disposed between the light-transmitting substrate and the display surface or between the light-transmitting substrate and the touch module, and the functional unit is one of an anti-electromagnetic interference (anti-EMI) plate, a polarizer and a micro-louver.

* * * * *